(12) United States Patent
Yamashita et al.

(10) Patent No.: US 10,828,693 B2
(45) Date of Patent: Nov. 10, 2020

(54) APPARATUS FOR MANUFACTURING FORGED CRANKSHAFT

(71) Applicant: NIPPON STEEL & SUMITOMO METAL CORPORATION, Tokyo (JP)

(72) Inventors: Tomohisa Yamashita, Suita (JP); Sho Takamoto, Osaka (JP); Hiroyuki Kurokawa, Nishinomiya (JP); Kunihiro Yabuno, Matsubara (JP); Ken Yoshino, Guangdong (CN); Kenji Tamura, Takatsuki (JP); Junichi Okubo, Amagasaki (JP)

(73) Assignee: NIPPON STEEL CORPORATION, Tokyo (JP)

( * ) Notice: Subject to any disclaimer, the term of this patent is extended or adjusted under 35 U.S.C. 154(b) by 346 days.

(21) Appl. No.: 15/572,258

(22) PCT Filed: May 13, 2016

(86) PCT No.: PCT/JP2016/064308
§ 371 (c)(1),
(2) Date: Nov. 7, 2017

(87) PCT Pub. No.: WO2016/182065
PCT Pub. Date: Nov. 17, 2016

(65) Prior Publication Data
US 2018/0147621 A1    May 31, 2018

(30) Foreign Application Priority Data
May 14, 2015  (JP) .................................. 2015-098704

(51) Int. Cl.
*B21J 13/00* (2006.01)
*B21K 1/08* (2006.01)
(Continued)

(52) U.S. Cl.
CPC ................... *B21K 1/08* (2013.01); *B21J 9/02* (2013.01); *B21J 13/025* (2013.01); *F16C 3/08* (2013.01); *F16C 2220/46* (2013.01)

(58) Field of Classification Search
CPC .......... B21J 13/02; B21J 13/025; B21J 13/03; B21J 9/027; B21K 1/08
See application file for complete search history.

(56) References Cited

U.S. PATENT DOCUMENTS

| 4,571,982 A * | 2/1986 | Bishop ..................... B21J 13/02 |
| | | 29/893.3 |
| 2012/0024105 A1* | 2/2012 | Ohnuma .................... B21J 5/02 |
| | | 74/605 |

(Continued)

FOREIGN PATENT DOCUMENTS

| JP | 2010-230027 | 10/2010 |
| JP | 2012-007726 | 1/2012 |

(Continued)

*Primary Examiner* — Debra M Sullivan
(74) *Attorney, Agent, or Firm* — Clark & Brody LP (57) ABSTRACT

An apparatus for manufacturing a forged crankshaft includes a pair of upper and lower dies and a first tool. The pair of dies deforms first excess portions and thereby thickens both side portions of a rough crank arm, in a region near a rough pin adjacent thereto. The first tool is fitted in an open space made in the pair of dies, and is capable of coming into contact with a rough-journal-facing surface of the rough crank arm, except the side portions in the region near the adjacent rough pin. The first pair of dies and the first tool have first guides to guide the first tool from a retracting position to a contacting position. The first guides include a first guide disposed on at least one of an upper surface and a lower surface of the first tool.

6 Claims, 8 Drawing Sheets

(51) Int. Cl.
*F16C 3/08* (2006.01)
*B21J 13/02* (2006.01)
*B21J 9/02* (2006.01)

(56) References Cited

U.S. PATENT DOCUMENTS

2013/0192330 A1\* 8/2013 Dohmann ................ B21J 13/02
 72/352
2016/0271684 A1\* 9/2016 Tamura ..................... F16C 3/08

FOREIGN PATENT DOCUMENTS

| WO | 2015/056440 | 4/2015 |
| WO | 2015/075934 | 5/2016 |
| WO | 2015/075940 | 5/2016 |

\* cited by examiner

APPARATUS FOR MANUFACTURING FORGED CRANKSHAFT

TECHNICAL FIELD

The present invention relates to an apparatus for manufacturing a crankshaft by hot forging.

BACKGROUND ART

A reciprocating engine to be employed in a motor vehicle, a motorcycle, an agricultural machine, a marine vessel or the like requires a crankshaft to extract power by converting reciprocating motions of pistons to rotational motion. There are two types of crankshafts: the type manufactured by die forging and the type manufactured by casting. Especially when high strength and high stiffness are required, die forged crankshafts (which will hereinafter be referred to as forged crankshafts) are often employed.

A forged crankshaft is generally manufactured by using a billet as a starting material. The billet has a circular or square cross section, and the cross-sectional area is constant throughout the length. A method for manufacturing a forged crankshaft includes a preforming step, a die forging step, and a trimming step. When correction is needed, a coining step is performed after the trimming step. Typically, the preforming step includes a rolling step and a bending step, and the die forging step includes a rough forging step and a finish forging step.

Figure 1A:
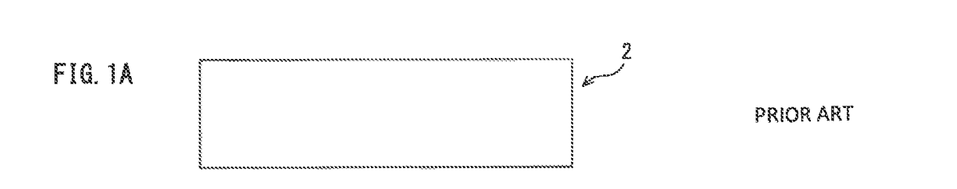
FIG. 1A is a schematic diagram of a billet during a conventional process of manufacturing a forged crankshaft.
Figure 1B:
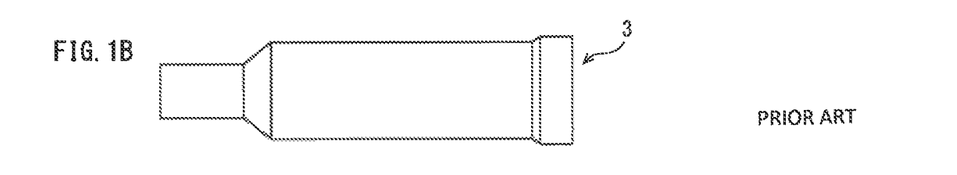
FIG. 1B is a schematic diagram of a rolled blank during the conventional process of manufacturing a forged crankshaft.
Figure 1C:
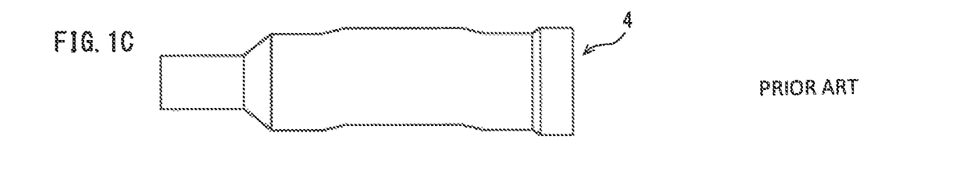
FIG. 1C is a schematic diagram of a bent blank during the conventional process of manufacturing a forged crankshaft.
Figure 1D:
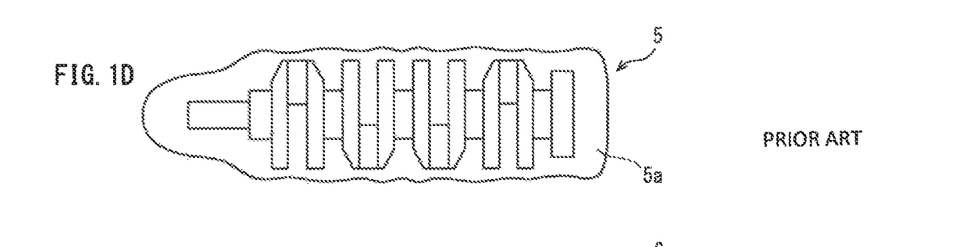
FIG. 1D is a schematic diagram of a rough forged blank during the conventional process of manufacturing a forged crankshaft.
Figure 1E:
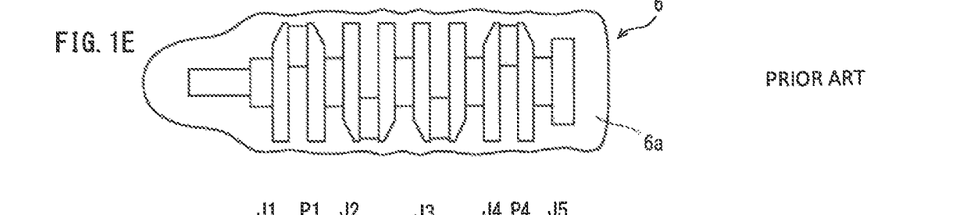
FIG. 1E is a schematic diagram of a finish forged blank during the conventional process of manufacturing a forged crankshaft.
Figure 1F:
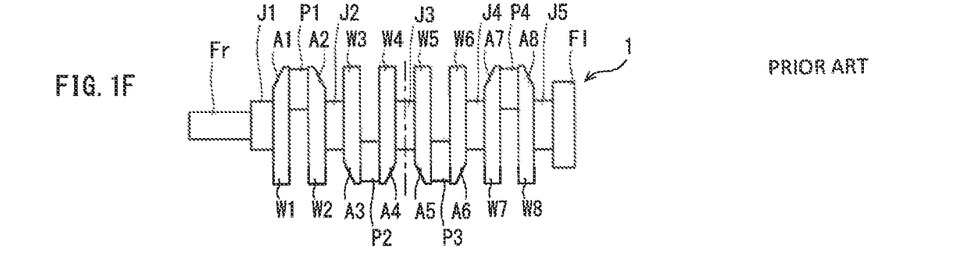
FIG. 1F is a schematic diagram of a crankshaft during the conventional process of manufacturing a forged crankshaft.

FIGS. 1A to 1F are schematic diagrams illustrating a conventional process for manufacturing a forged crankshaft. The crankshaft 1 illustrated in FIG. 1F is a four-cylinder eight-counterweight crankshaft to be mounted in a four-cylinder engine. The crankshaft 1 includes five journals J1 to J5, four pins P1 to P4, a front part Fr, a flange Fl, and eight crank arms (hereinafter referred to simply as "arms") A1 to A8. The eight arms A1 to A8 connect the journals J1 to J5 respectively to the pins P1 to P4. The eight arms A1 to A8 have counterweights (hereinafter referred to simply as "weights") W1 to W8, respectively. The weights W1 to W8 are integrated with the arms A1 to A8, respectively.

The four pins P1 to P4 are decentered from the journals J1 to J5. The phases of the pins P1 to P4 are set such that the pins P1 to P4 are positioned plane symmetrically with respect to the journal J3 positioned in the center in the longitudinal direction of the crankshaft 1. Accordingly, the arms A4 and A5 connecting with the central journal J3 are plane symmetrical with respect to the central journal J3. Thus, the two arms A4 and A5 both connect with one journal J3 and connect with the pins P2 and P3, respectively, which are in the same phase.

In the following paragraphs, when the journals J1 to J5, the pins P1 to P4, the arms A1 to A8, and the weights W1 to W8 are each collectively referred to, a reference character "J" is used for the journals, a reference character "P" for the pins, a reference character "A" for the arms, and a reference character "W" for the weights. A pin P and a couple of arms A (including weights W) connecting with the pin P are collectively referred to as a "throw".

According to the manufacturing method shown in FIGS. 1A to 1F, the forged crankshaft 1 is manufactured in the following manner. First, a billet 2 with a predetermined length as shown in FIG. 1A is heated in a heating furnace (for example, an induction heating furnace or a gas atmosphere furnace) and then undergoes rolling. In the rolling step, the billet 2 is rolled and drawn by grooved rolls. Thereby, the volume of the billet 2 is distributed in the longitudinal direction, and a rolled blank 3, which is an intermediate material, is formed (see FIG. 1B). Next, in the bending step, the rolled blank 3 is partially reduced from a direction perpendicular to the longitudinal direction. Thereby, the volume of the rolled blank 3 is distributed, and a bent blank 4, which is a secondary intermediate material, is formed (see FIG. 1C).

Next, in the rough forging step, the bent blank 4 is reduced by a pair of upper and lower dies, whereby a rough forged blank 5 is formed (see FIG. 1D). The rough forged blank 5 has a rough shape of the crankshaft (finished product). Then, in the finish forging step, the rough forged blank 5 is further reduced by a pair of upper and lower dies, whereby a finish forged blank 6 is formed (see FIG. 1E). The finish forged blank 6 has a shape almost in agreement with the finished crankshaft. In the rough forging step and the finish forging step, excess material flows out from between the mutually opposed parting faces of the dies, thereby forming flash. Therefore, the rough forged blank 5 and the finish forged blank 6 have large flash 5a and 6a around the shape of the crankshaft.

In the trimming step, while the finish forged blank 6 with flash 6a is held by a pair of dies, the flash is punched by a cutting die. Thereby, the flash 6a is removed from the finish forged blank 6. In this manner, a finish forged blank with no flash is obtained, and the finish forged blank with no flash has almost the same shape as the forged crankshaft 1 shown in FIG. 1F. The forged blank with no flash includes rough journals J', rough pins P', rough crank arms A' and rough weights W', which correspond to the journals J, the pins P, the arms A, and the weights W, respectively, of the forged crankshaft.

In the coining step, principal parts of the forged blank with no flash are slightly pressed by dies from above and below and shaped to have the correct size and shape of the finished product. In this regard, the principal parts of the forged blank with no flash are, for example, the rough journals J', the rough pins P', the rough arms A' and the rough weights W'. The principal parts of the forged blank with no flash further include shaft parts such as a rough front part and a rough flange, which correspond to the front part Fr and the flange part Fl of the crankshaft, respectively. In this manner, the forged crankshaft 1 is manufactured.

The process shown in FIGS. 1A to 1F is applicable not only for manufacturing a four-cylinder eight-counterweight crankshaft as illustrated in FIG. 1F but also for manufacturing various other types of crankshafts. For example, the process is applicable for manufacturing a four-cylinder four-counterweight crankshaft.

Figure 2:
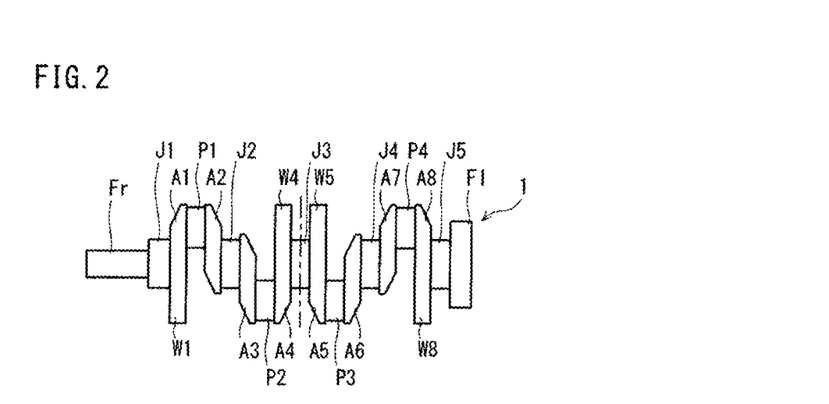
FIG. 2 is a diagram showing a four-cylinder four-counterweight crankshaft having an exemplary configuration.

FIG. 2 is a schematic diagram of a four-cylinder four-counterweight crankshaft having an exemplary configuration. In the four-cylinder four-counterweight crankshaft, the first arm A1 at the front, the eighth arm A8 at the rearmost, and the two central arms (the fourth arm A4 and the fifth arm A5) have weights W1, W4, W5 and W8, respectively. The other arms, namely, the second, the third, the sixth and the seventh arms A2, A3, A6 and A7 have no weights.

The process shown by FIGS. 1A to 1F can be also applied for manufacturing crankshafts that are to be mounted in a three-cylinder engine, an inline six-cylinder engine, a V-type six-cylinder engine, an eight-cylinder engine and the like. When adjustment of the placement angles of the pins is necessary, a twisting step is added after the trimming step.

In recent years, there has been a need for weight reduction of reciprocating engines, particularly those for motor vehicles, in order to improve the fuel economy. Accordingly, there is also an ever-increasing demand for weight reduction of crankshafts to be mounted in reciprocating engines. The following techniques are known as ways to reduce the weight of a forged crankshaft.

Patent Literatures 1 and 2 disclose an arm having a recess in the journal-facing surface. These literatures also disclose a method for manufacturing a crankshaft including an arm having a recess. The recess of the arm is formed to lie on a straight line connecting the axis of the journal and the axis of the pin (which will hereinafter be referred to as an "arm centerline"), and the recess is made deep toward the pin. This arm is reduced in weight by an amount corresponding to the volume of the recess. The weight reduction of the arm leads to a weight reduction of the weight paired with the arm, thereby resulting in a weight reduction of the whole forged crankshaft. The arm having a recess has thick portions on both sides of the arm centerline in the region near the pin, which ensures stiffness (both torsional rigidity and flexural rigidity).

Thus, thickening both side portions of an arm and thereby forming a recessed portion in the journal-facing surface of the arm ensure weight reduction and stiffness.

It is, however, difficult to manufacture such a forged crankshaft with such arms having a unique shape by a conventional manufacturing method. The reason is as follows. When a recess is to be formed in the surface of an arm in the die forging step, the draft of the die will become a reverse draft at the site of the recess, and therefore, the formed forged blank will not be able to be taken out of the die.

To avoid such situations, the manufacturing methods disclosed in Patent Literatures 1 and 2 are configured as follows. In the die forging step, the arm is shaped to be small with no recess formed in the surface of the arm, and after the trimming step, a punch is pushed into the surface of the arm to form a recess.

CITATION LIST

Patent Literature

Patent Literature 1: Japanese Patent Application Publication No. 2012-7726
Patent Literature 2: Japanese Patent Application Publication No. 2010-230027

SUMMARY OF INVENTION

Technical Problems

As disclosed in Patent Literatures 1 and 2, by forming a recess in the journal-facing surface of an arm, it is possible to thicken both side portions of the arm. This permits manufacture of a forged crankshaft with a reduced weight and assured stiffness.

In the manufacturing methods disclosed in Patent Literatures 1 and 2, however, in forming a recess, a surface of an arm is strongly punched and is deformed entirely, and a great force is necessary for the punching. Therefore, a special mechanism for supplying a great force to a punch is required, and it is also necessary to give attention to the durability of the punch.

Then, in PCT/JP2014/005835 (which will hereinafter be referred to as "Patent Literature 3"), the inventors suggested forming a recess in the journal-facing surface of an arm by bending an excess portion. Specifically, in a die forging step, a forged blank that includes a rough arm having excess portions protruding from the outer peripheries of both side portions in a region near an adjacent rough pin is formed. In a coining step, the excess portions are bent toward the rough-journal-facing surface of the rough arm by a pair of upper and lower dies. In this case, there is no need to supply a great force to form a recess, and a forged crankshaft having a reduced weight and assured stiffness can be manufactured easily.

In Patent Literature 3, the inventors also suggested that, when the excess portions are bent toward the rough-journal-facing surface of the rough arm in the coining step, a tool be caused to contact the rough-journal-facing surface of the rough arm except the side portions to hold the surface of the rough arm. This allows the side portions of the arm to be shaped accurately.

Also, in PCT/JP2014/005850 (which will hereinafter be referred to as "Patent Literature 4"), the inventors suggested crashing the excess portions instead of bending. Specifically, the inventors suggested forming a recess in the journal-facing-surface of an arm by crashing the excess portions by use of a pair of upper and lower dies. In Patent Literature 4 also, the inventors suggested that, when the excess portions are crashed, a tool be caused to contact the rough-journal-facing surface of the rough arm except the side portions to hold the surface of the rough arm.

However, the movable range of the tool that is to be brought into contact with the rough-journal-facing surface of the rough arm is, in many cases, insufficient. Especially when tools are to be brought into contact with rough arms that are plane symmetrical with respect to a rough journal, the movable ranges of the tools are likely to be insufficient. The reason is described below with reference to FIGS. 3A to 3E.

Figure 3A:
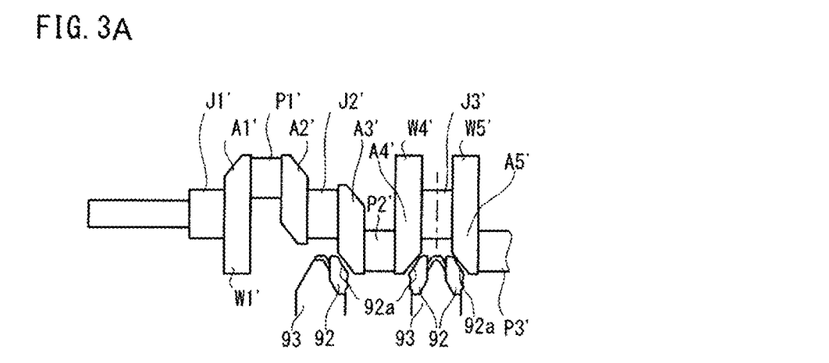
FIG. 3A is a top view showing the positional relationship between a forged blank and tools.
Figure 3B:
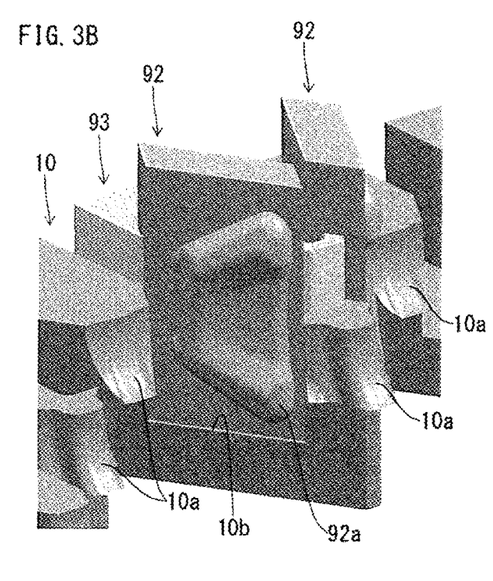
FIG. 3B is a perspective view of a mechanism for moving the tools.
Figure 3C:
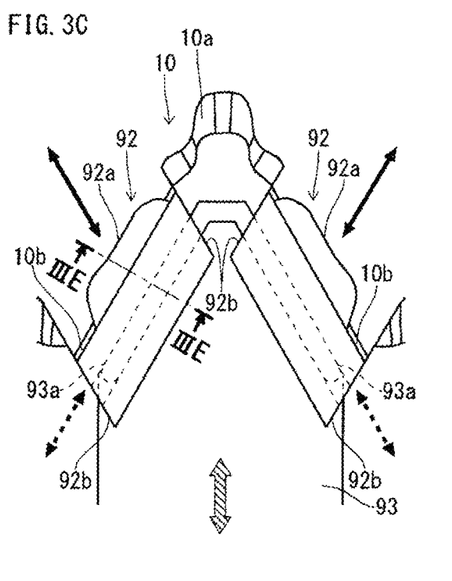
FIG. 3C is a top view showing a state where the tools are in contacting positions.
Figure 3D:
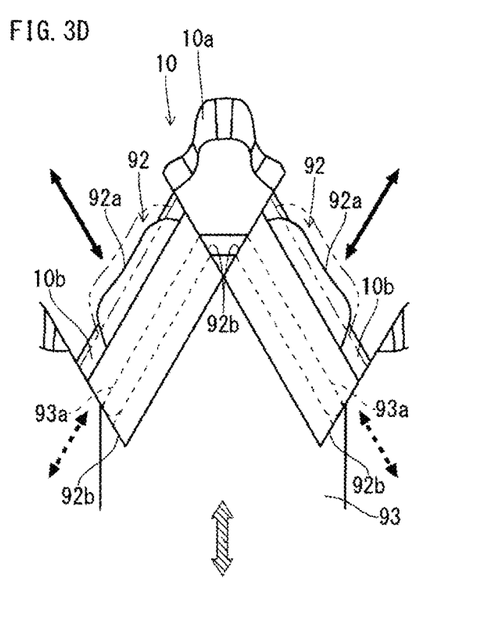
FIG. 3D is a top view showing a state where the tools are in retracting positions.
Figure 3E:
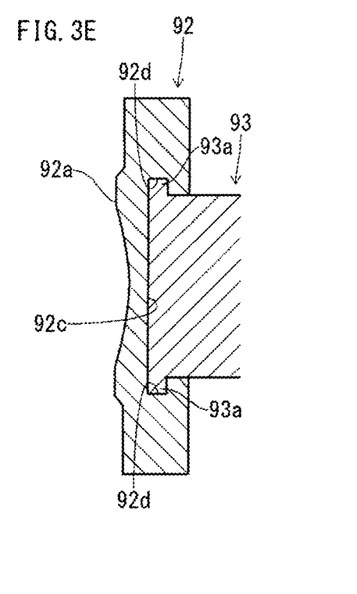
FIG. 3E is a sectional view along the line IIIE-IIIE in FIG. 3C.

FIGS. 3A to 3E are diagrams of a mechanism for causing tools to come into contact with the rough-journal-facing surfaces of two plane-symmetrical rough arms. FIG. 3A is a top view showing the positional relationship between a forged blank and the tools. FIG. 3B is a perspective view of the mechanism. FIG. 3C is a top view when the tools are in contacting positions. FIG. 3D is a top view when the tools are in retracting positions. FIG. 3E is a sectional view along the line IIIE-IIIE in FIG. 3C. The mechanism includes dies 10, two tools 92, and a jig 93. To make the drawings easy to understand, in FIGS. 3A and 3E, the dies 10 are omitted. In FIGS. 3B to 3D, the lower die of the dies 10 is partly shown. In FIG. 3A, a forged blank to be formed into a four-cylinder four-counterweight crankshaft is shown.

In FIG. 3A, a case where the jig 93 faces the second rough journal J2' and a case where the jig 93 faces the third rough journal J3' are shown. As shown in FIG. 3A, during the coining step, the front faces 92a of the tools 92 contact the forged blank. The front faces 92a of the tools have shapes reflecting the journal-facing surfaces of the arms. Groove-like open spaces 10b are made in the dies 10, and the tools 92 are fitted in the open spaces 10b (see FIG. 3B).

During the coining step, the tools 92 are set in the contacting positions as shown in FIG. 3C. At the time of carrying in the forged blank before coining and at the time of taking out the forged blank after coining, the tools 92 are moved to the retracting positions and separated from the forged blank as shown in FIG. 3D. In FIG. 3D, the front faces of the tools in the contacting positions are indicated by chain double-dashed lines.

When moving from the retracting positions to the contacting positions, the tools 92 move along both side walls of the groove-like open spaces 10b and both side surfaces 92b of the tools 92 (see the solid arrows in FIGS. 3C and 3D).

In other words, the side walls of the groove-like open spaces 10b and the side surfaces 92b of the tools 92 function as guides.

The tools 92 are supported by the jig 93. The jig 93 is fitted in a groove-like open space made in the dies 10. The jig 93 is connected to a drive unit (not shown) and can be moved in a pin decentering direction (see the hatched arrow in FIG. 3C) by operation of the drive unit.

The jig 93 supports the tools 92 such that the tools 92 are movable. The jig 93 shown in FIGS. 3A to 3E supports the tools 92 such that the tools 92 are movable in slide directions (see the dashed arrows in FIGS. 3C and 3D). To this end, the jig 93 has, on an upper surface and a lower surface, projections 93a extending in the slide directions. As the groove-like open spaces 10b made in the dies 10 do, the projections 93a function as guides. A recessed portion 92c and grooves 92d are formed in the back face of each of the tools 92 (in the face opposite to the front face 92a) such that the projections 93a of the jig 93 are fitted in the grooves 92d as shown in FIG. 3E.

Along with a movement of the jig 93 in the pin decentering direction, the tools 92 move along the guides. In this regard, the movements of the tools 92 in the slide directions are restricted by the side walls of the groove-like open spaces 10b and the side surfaces 92b of the tools 92. Accordingly, as the jig 93 is moving in the pin decentering direction, the tools 92 move in the slide directions relative to the jig 93.

In the crankshaft, as shown in FIGS. 1F and 2, the arms A are arranged in the longitudinal direction of the crankshaft. Therefore, the spaces for the tools are small. In the mechanism for moving the tools shown in FIGS. 3A to 3E, the side surfaces 92b of the tools 92 are used as guides, and therefore, the widths of the tools are great. Then, the tools 92 are likely to interfere with the jig 93 and the dies 10, and the movable ranges of the tools become insufficient. Therefore, after the coining step, when the forged blank is to be taken out with the tools 92 retracted in the retracting positions, the tools 92 interfere with the forged blank, and thus, the take-out of the forged blank after coining is difficult.

Especially when the tools are to be brought into contact with two arms that are plane symmetrical with respect to a journal, it is necessary to place the two tools between the two arms, and the two tools are likely to interfere with each other. Accordingly, the movable ranges of the tools become further narrower.

An object of the present invention is to provide a forged crankshaft manufacturing apparatus that assures sufficient movable ranges for tools in a process of deforming excess portions of a forged blank with no flash so that the processed forged blank can be taken out smoothly.

SOLUTIONS TO PROBLEMS

A forged crankshaft manufacturing apparatus according to an embodiment of the present invention is to process a forged blank from which flash has been removed, in a process of manufacturing a forged crankshaft. The forged crankshaft includes journals serving as an axis of rotation, pins decentered from the journals, and crank arms connecting the journals and the pins. The forged crankshaft further includes one or more counterweights integrated with one or more of the crank arms. The forged blank includes rough journals, rough pins, rough crank arms and rough counterweights corresponding to the journals, the pins, the crank arms and the counterweights, respectively, of the forged crankshaft. At least one of the rough crank arms includes a first excess portion protruding from a side portion in a region near an adjacent one of the rough pins.

The forged crankshaft manufacturing apparatus includes a pair of upper and lower dies, and a first tool. The pair of dies is capable of deforming the first excess portion and thereby thickening the side portion of the rough crank arm including the first excess portion in the region near the adjacent rough pin. The first tool is fitted in an open space made in the pair of dies, and the first tool is capable of coming into contact with a rough-journal-facing surface of the rough crank arm including the first excess portion, except the side portion in the region near the adjacent rough pin. The pair of dies and the first tool have first guides to guide the first tool from a retracting position to a contacting position. The first guide of the first tool disposed on at least one of an upper surface and a lower surface of the first tool.

ADVANTAGEOUS EFFECTS OF INVENTION

A forged crankshaft manufacturing apparatus according to the present invention includes a first tool to come into contact with the journal-facing surface of an arm. The first tool has a first guide on at least one of the upper surface or the lower surface. This permits appropriate changes to be made to the shapes of the side surfaces of the first tool for prevention of the interference of the first tool with the jig and/or the dies. Thereby, a sufficiently wide movable range is assured for the first tool.

DESCRIPTION OF EMBODIMENTS

A forged crankshaft manufacturing apparatus according to an embodiment of the present invention processes a forged blank with no flash during a process of manufacturing a forged crankshaft. The forged crankshaft includes journals serving as an axis of rotation, pins decentered from the journals, and crank arms connecting the journals and the pins. The forged crankshaft further includes one or more counterweights integrated with one or more of the rough arms. The forged blank includes rough journals, rough pins, rough crank arms and rough counterweights, which correspond to the journals, the pins, the crank arms and the counterweights, respectively, of the forged crankshaft. At least one of the rough crank arms has a first excess portion protruding from the outer periphery of a side portion in a region near an adjacent one of the rough pins.

The forged crankshaft manufacturing apparatus includes a pair of upper and lower dies, and a first tool. The pair of dies is capable of deforming the first excess portion and thereby thickening the side portion of the rough crank arm in the region near the adjacent rough pin. The first tool is fitted in an open space made in the dies, and is capable of coming into contact with the rough-journal-facing surface of the rough crank arm having the first excess portion, except the side portion in the region near the adjacent rough pin. The pair of dies and the first tool have first guides to guide the first tool from a retracting position to a contacting position. The first guide of the first tool disposed on at least one of the upper surface and the lower surface of the first tool.

It is preferred that the forged crankshaft manufacturing apparatus further includes a first jig movable in a pin decentering direction in which the pins are decentered. The first jig preferably supports the first tool such that the first tool is movable in a first slide direction that is at an angle to a first guide direction in which the first tool is guided by the first guides. The first tool preferably comes into contact with the rough-journal-facing surface of the rough crank arm having the first excess portion, except the side portion in the region near the adjacent rough pin. The first tool preferably moves in the first guide direction along with a movement of the first jig.

The forged crankshaft manufacturing apparatus is to manufacture a forged crankshaft in which every one of the crank arms has a counterweight integrated therewith.

When only some of the crank arms of the forged crankshaft have counterweights integrated therewith, the forged crankshaft manufacturing apparatus may have a configuration as described below.

In the forged crankshaft, at least one of the rough crank arms with no rough counterweights includes a second excess portion protruding from an outer periphery of a side portion in a region near an adjacent one of the rough journals. The pair of dies is further capable of deforming the second excess portion and thereby thickening the side portion of the rough crank arm with no rough counterweight in the region near the adjacent rough journal. The manufacturing apparatus is placed in an open space made in the dies. The manufacturing apparatus further includes a second tool. The second tool is capable of coming into contact with the rough-pin-facing surface of the rough crank arm having the second excess portion, except the side portion in the region near the adjacent rough journal. The pair of dies and the second tool have second guides to guide the second tool from a retracting position to a contacting position. The second guide of the second tool disposed on at least one of an upper surface and a lower surface of the second tool.

The dies of the manufacturing apparatus are preferably dies to apply coining to the forged blank.

A forged crankshaft manufacturing apparatus according to an embodiment of the present invention will hereinafter be described with reference to the drawings.

1. Shape of Crankshaft

Figure 6A:
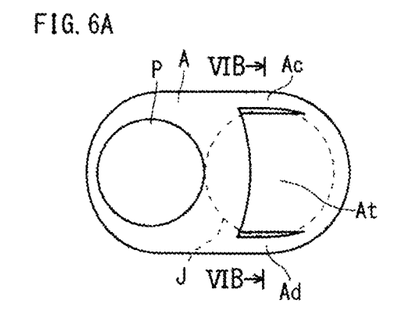
FIG. 6A is a front view schematically showing the shape of an arm of a crankshaft having a second exemplary configuration according to the present invention.
Figure 6B:
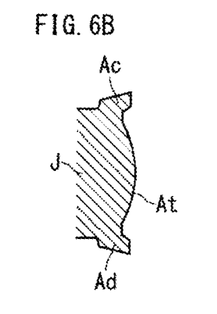
FIG. 6B is a sectional view along the line VIB-VIB in FIG. 6A.

A forged crankshaft that is the target of the present embodiment includes journals serving as an axis of rotation, pins decentered from the journals, and arms connecting the journals and the pins. The forged crankshaft further includes one or more weights integrated with one or more of the arms. Every one of the arms may have a weight integrated therewith. Such a crankshaft may have, for example, a first exemplary configuration as shown by FIGS. 4A to 4D or a second exemplary configuration as shown by FIGS. 6A and 6B.

Whether the forged crankshaft has the first exemplary configuration or the second exemplary configuration, the forged crankshaft includes at least one arm having a recess in the journal-facing surface. The crankshaft having the second exemplary configuration includes at least one arm with no weight integrated therewith. The arm with no weight has a recess in the pin-facing surface.

Figure 4A:
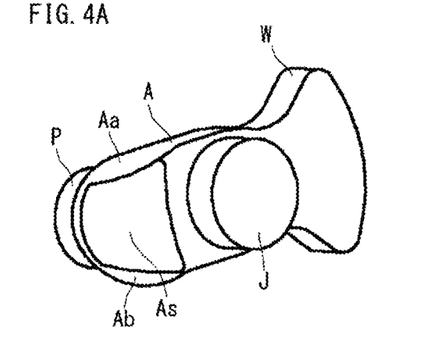
FIG. 4A is a perspective view schematically showing the shape of an arm of a crankshaft having a first exemplary configuration according to the present invention.
Figure 4B:
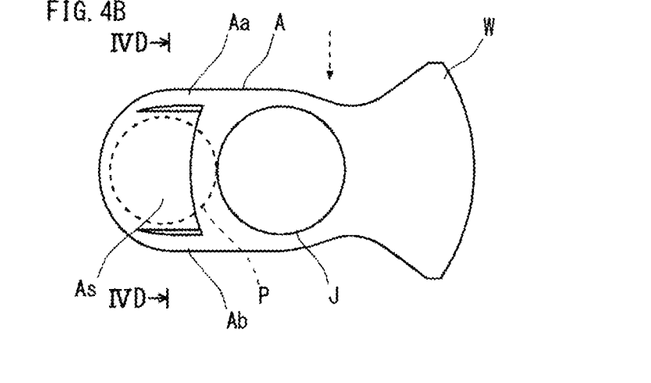
FIG. 4B is a top view schematically showing the shape of the arm of the crankshaft having the first exemplary configuration according to the present invention.
Figure 4C:
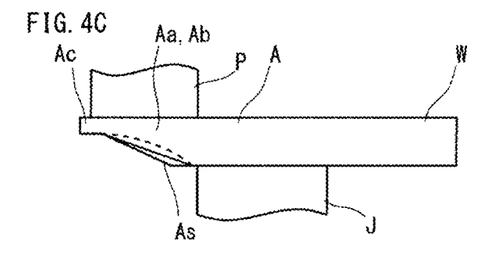
FIG. 4C is a side view schematically showing the shape of the arm of the crankshaft having the first exemplary configuration according to the present invention.
Figure 4D:
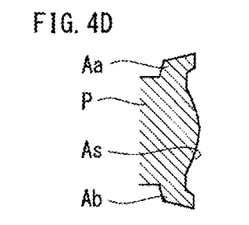
FIG. 4D is a sectional view along the line IVD-IVD in FIG. 4B.

FIGS. 4A to 4D are diagrams showing the shape of an arm of a crankshaft after processed in the coining step, the crankshaft having the first exemplary configuration according to the present invention. FIG. 4A is a perspective view, FIG. 4B is a front view from the journal-facing surface, FIG. 4C is a side view, and FIG. 4D is a sectional view along the line IVD-IVD in FIG. 4B. In FIGS. 4A to 4D, an arm representing the arms (having weights integrated therewith) of the crankshaft is shown, and the other arms are omitted. FIG. 4C is a view from the direction indicated by the dashed arrow in FIG. 4B.

The arm A of the crankshaft having the first exemplary configuration, as shown in FIGS. 4A to 4D, has a recess in the journal J-facing surface, in a region near the adjacent pin P, in an area As inside of both side portions Aa and Ab. The side portions Aa and Ab in the region near the adjacent pin P bulge toward the journal J. The thicknesses of the side portions Aa and Ab are greater than the thickness of the recess in the inner area As.

In the first exemplary configuration, the arm A has thick side portions As and Ab in the region near the adjacent pin P, and has a recess in the journal J-facing surface. According to the present embodiment, the recess made in the arm A leads to a weight reduction of the forged crankshaft. Besides, the thick side portions Aa and Ab of the arm A ensure stiffness.

In the crankshaft having the first exemplary configuration, both side portions Aa and Ab of the arm A in the region near the adjacent pin P are thick. However, only one side portion of the arm A in the region near the adjacent pin P may be thick. Even in this case, the thick portion of the arm A in the region near the adjacent pin P ensures the arm A stiffness.

Figure 5A:
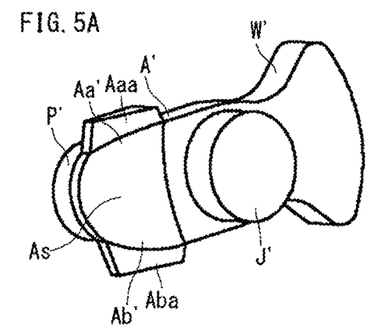
FIG. 5A is a perspective view schematically showing the shape of a rough arm of a forged blank with no flash for the first exemplary configuration according to the present invention.
Figure 5B:
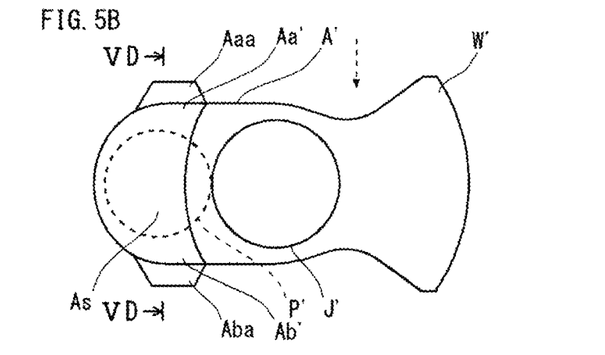
FIG. 5B is a front view schematically showing the shape of the rough arm of the forged blank with no flash for the first exemplary configuration according to the present invention.
Figure 5C:
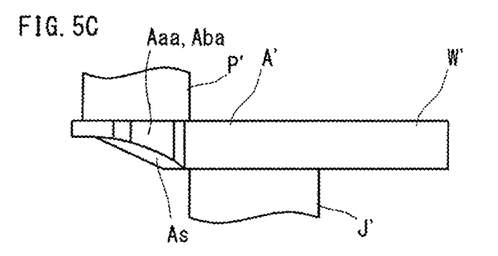
FIG. 5C is a side view schematically showing the shape of the rough arm of the forged blank with no flash for the first exemplary configuration according to the present invention.
Figure 5D:
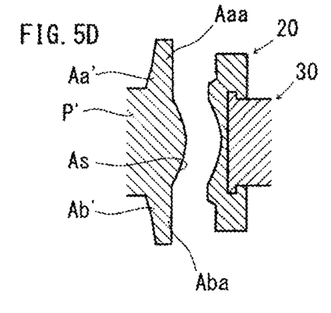
FIG. 5D is a sectional view along the line VD-VD in FIG. 5B.

FIGS. 5A to 5D are diagrams showing the shape of a rough arm of a forged blank with no flash before processed in the coining step, the forged blank being for the forged crankshaft having the first exemplary configuration according to the present invention. FIG. 5A is a perspective view, FIG. 5B is a front view from the journal-facing surface, FIG. 5C is a side view, and FIG. 5D is a sectional view along the line VD-VD in FIG. 5B. In FIGS. 5A to 5D, a rough arm representing the rough arms (having rough weights integrated therewith) of the forged blank is shown, and the other rough arms are omitted. FIG. 5C is a view from the direction indicated by the dashed arrow in FIG. 5B. To make the drawings easy to understand, FIG. 5D further shows a first tool 20 and a jig 30 of a manufacturing apparatus which will be described later.

As shown in FIGS. 5A to 5D, the rough arm A' before processed in the coining step has the same surface shape as the finished product after processed in the coining step, in the rough-journal J'-facing surface, in a region near the adjacent rough pin P', in an area As inside of both side portions Aa' and Ab'. The surface shape extends smoothly to the side portions Aa' and Ab' in the region near the adjacent rough pin P'. Accordingly, the thicknesses of the side portions Aa' and Ab' are smaller than the thicknesses of the side portions of the finished product after processed in the coining step.

The rough arm has first excess portions Aaa and Aba protruding from the outer peripheries of the side portions Aa' and Ab' in the region near the adjacent rough pin P'. The first excess portions Aaa and Aba are plate-shaped, and are disposed along the outer periphery of the side portion Aa' and the outer periphery of the side portion Ab', respectively, in the region near the adjacent pin P'. The thicknesses of the first excess portions Aaa and Aba are comparable to or less than the thicknesses of the side portions Aa' and Ab' which are the bases thereof.

In the forged blank for the first exemplary configuration, all of the rough arms A' of the forged blank may have such first excess portions Aaa and Aba. Alternatively, some of the rough arms A' may have such first excess portions Aaa and Aba. In the above-described first exemplary configuration, the rough arm A' has two first excess portions Aaa and Aba. However, the rough arm A' may have only one first excess portion. In this case, in the finished crankshaft, the arm has one thick side portion in the region near the adjacent pin.

FIGS. 6A and 6B are diagrams showing the shape of an arm of a crankshaft after processed in the coining step, the crankshaft having the second exemplary configuration according to the present invention. FIG. 6A is a front view from the pin-facing surface, and FIG. 6B is a sectional view along the line VIB-VIB in FIG. 6A. In the second exemplary configuration, the crankshaft includes a plurality of arms, and only some of the arms have weights integrated therewith. In FIGS. 6A and 6B, an arm with no weight extracted from the crankshaft is shown, and the other arms of the crankshaft are not shown.

In the second exemplary configuration, as in the first exemplary configuration, the arm A has thick side portions in the region near the adjacent pin P and has a recess in the journal-facing surface although it is not shown in the drawings. In the second exemplary configuration, the arm A, which does not have a weight, additionally has another recess in the pin P-facing surface, in a region near the adjacent journal J, in an area At inside of both side portions Ac and Ad. The side portions Ac and Ad in the region near the adjacent journal J bulge toward the adjacent pin P. The thicknesses of the side portions Ac and Ad are greater than the thickness of the recess.

In the second exemplary configuration, the arm A has thick side portions in the region near the adjacent P and has a recess in the journal J-facing surface. The arm A, which does not have a weight, further has thick side portions Ac and Ad in the region near the adjacent journal J and has a recess in the pin P-facing surface. In the second exemplary configuration, the recesses formed in the journal J-facing surface and the pin P-facing surface of the arm A lead to a weight reduction of the forged crankshaft. Besides, the thick side portions in the region near the adjacent pin P and the thick side portions Ac and Ad in the region near the journal J ensure the arm A stiffness.

In the second exemplary configuration, both side portions of the arm A in the region near the adjacent pin P are thick, and both side portions Ac and Ad of the arm A in the region near the adjacent journal J are thick. However, only one side portion of the arm A in the region near the adjacent pin P may be thick, and only one side portion of the arm A in the region near the adjacent journal J may be thick. Even in this case, the thick side portion of the arm A in the region near the adjacent pin P and the thick side portion in the adjacent journal J ensure the arm A stiffness.

Figure 7A:
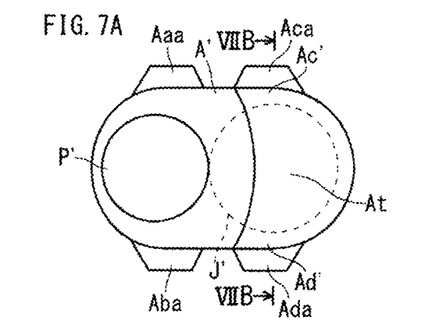
FIG. 7A is a front view schematically showing the shape of a rough arm of a forged blank with no flash for the second exemplary configuration according to the present invention.
Figure 7B:
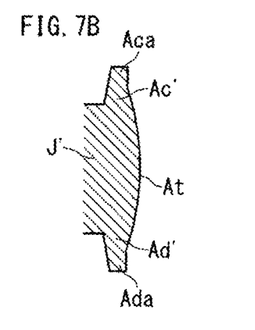
FIG. 7B is a sectional view along the line VIIB-VIIB in FIG. 7A.

FIGS. 7A and 7B are diagrams showing a rough arm of a forged blank with no flash before processed in the coining step, the forged blank being for the second exemplary configuration according to the present invention. FIG. 7A is a front view from the rough-pin-facing surface, and FIG. 7B is a sectional view along the line VIIB-VIIB in FIG. 7A. In FIGS. 7A to 7B, one of the rough arms with no rough weights extracted from the forged blank is shown, and the other rough arms are omitted.

As in the forged blank for the first exemplary configuration, the rough arm A' before processed in the coining step has the same surface shape as the finished product after processed in the coining step, in the rough-journal J'-facing surface, in a region near the adjacent rough pin P, in an area inside of both side portions, though it is not shown in the drawings. As in the forged blank for the first exemplary configuration, the rough arm A' has first excess portions Aaa and Aba protruding from the outer peripheries of the side portions Aa' and Ab' in the region near the adjacent rough pin P.

Unlike in the forged blank for the first exemplary configuration, the rough arm A' with no rough weight before processed in the coining step, as shown in FIGS. 7A and 7B, has the same surface shape as the finished product after processed in the coining, in the rough-pin P-facing surface, in a region near the adjacent rough journal J', in an area At inside of both side portions Ac' and Ad'. The surface shape extends smoothly to the side portions Ac' and Ad' in the region near the adjacent rough journal J'. Accordingly, the thicknesses of the side portions Ac' and Ad' in the region near the adjacent rough journal J' are smaller than the thicknesses of the side portions of the finished product after processed in the coining step.

The rough arm A' with no rough weight further has second excess portions Aca and Ada protruding from the outer peripheries of side portions Ac' and Ad' in a region near the adjacent rough journal J'. The second excess portions Aca and Ada are plate-shaped, and are disposed along the outer periphery of the side portion Ac' and the outer periphery of the side portion Ad', respectively, in the region near the adjacent rough journal J'. The thicknesses of the second excess portions Aca and Ada are comparable to or less than the thicknesses of the side portions Ac' and Ad' which are the bases thereof.

In the forged blank for the second exemplary configuration, all of the rough arms A' may have such second excess portions Aca and Ada. Alternatively, some of the rough arms A' may have such second excess portions Aca and Ada. In the second exemplary configuration, the rough arm A' has two first excess portions Aaa and Aba, and two second excess portions Aca and Ada. However, the rough arm A' may have only one first excess portion and may have only one second excess portion. When the rough arm A' has only one second excess portion, in the finished crankshaft, the arm has one thick side portion in the region near the adjacent pin.

2. Forged Crankshaft Manufacturing Apparatus

Figure 8A:
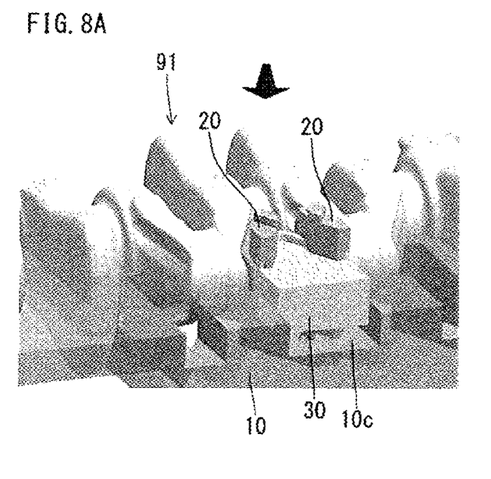
FIG. 8A is a perspective view schematically showing a forged crankshaft manufacturing apparatus according to an embodiment.
Figure 8B:
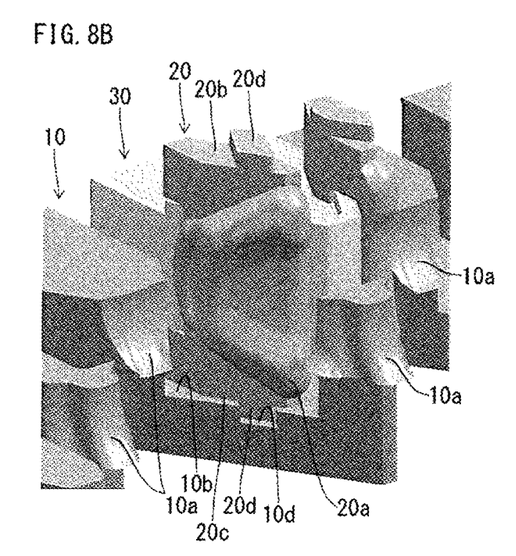
FIG. 8B is an enlarged perspective view of the forged crankshaft manufacturing apparatus according to the embodiment from a direction indicated by the arrow in FIG. 8A.
Figure 8C:
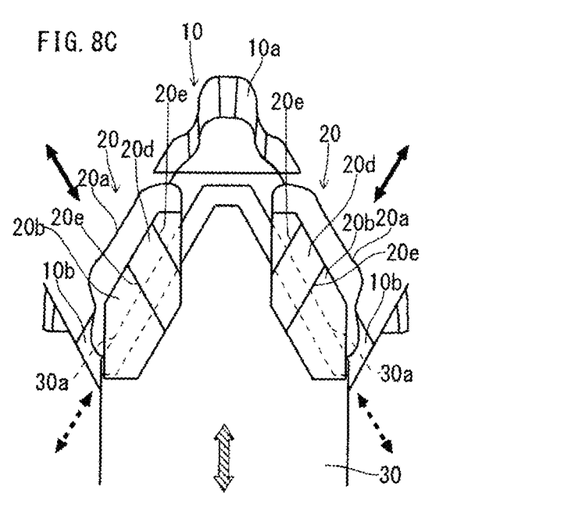
FIG. 8C is a top view showing a state where tools are in contacting positions in the forged crankshaft manufacturing apparatus according to the embodiment.
Figure 8D:
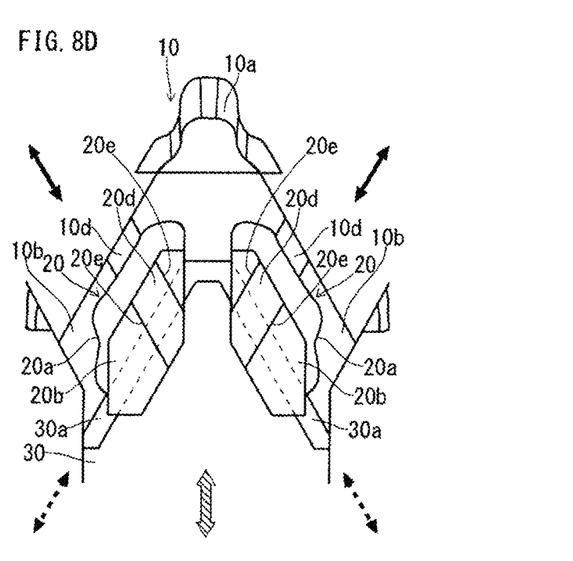
FIG. 8D is a top view showing a state where the tools are in retracting positions in the forged crankshaft manufacturing apparatus according to the embodiment.

FIGS. 8A to 8D are diagrams showing a forged crankshaft manufacturing apparatus having an exemplary configuration. FIG. 8A is a perspective view, FIG. 8B is an enlarged perspective view from the direction indicated by the arrow in FIG. 8A, FIG. 8C is a top view showing a state where tools are in contacting positions, and FIG. 8D is a top view showing a state where the tools are in retracting positions. In FIGS. 8A to 8D, a forged blank 91 with no flash, a part of a lower die of the pair of dies 10, a first tool 20 and a first jig 30 are shown. To make the drawings easy to understand, in FIGS. 8B to 8D, the forged blank 91 is omitted.

The forged blank 91 shown in FIG. 8A is a forged blank for a four-cylinder four-counterweight crankshaft. The first, the fourth, the fifth and the eighth rough arms of the forged blank 91 have rough weights integrated therewith. As in the forged blank shown in FIG. 5A, at least one of the rough arms has first excess portions protruding from the outer peripheries of both side portions in a region near the adjacent rough pin.

The first tool 20 comes into contact with the rough journal-facing surface of the rough arm except the side portions. For example, a front face 20a of the first tool 20 comes into contact with the rough-journal J'-facing surface of the rough arm A', and specifically the inner area As inside of the side portions Aa' and Ab' in the region near the adjacent rough pin P, that is, an area to become a recess after the process.

The manufacturing apparatus includes several first tools. In FIG. 8A, only two of the first tools are shown, and the other first tools are omitted. The two first tools shown in FIG. 8A are in contact with the rough-journal-facing surfaces of two rough arms (the fourth rough arm and the fifth rough arm) that are plane symmetrical with respect to the rough journal therebetween. FIGS. 8B to 8D show the two first tools shown in FIG. 8A and the surrounding area thereof.

The pair of dies 10 is composed of an upper die and a lower die. To make the drawings easy to understand, in FIGS. 8A to 8D, the upper die is not shown, and only a part of the lower die is shown.

The upper die and the lower die are to process the forged blank with no flash. The upper die and the lower die deform the protruding excess portions. The upper die and the lower die have impressions. Impressions 10a shown in FIGS. 8A to 8D is a part of the impression of the lower die.

The impressions of the upper die and the lower die reflect the shape of the finished crankshaft except a part thereof. Specifically, when recesses are to be formed in the respective journal-facing surfaces of arms (see FIGS. 4A to 4D), the dies 10 (the upper die and the lower die) have open spaces 10b for the first tools 20. Accordingly, the impressions of the dies 10 do not reflect the recesses in the journal-facing surfaces of the arms.

When recesses are to be formed in the respective pin-facing surfaces of arms (see FIGS. 6A and 6B), the impressions of the dies 10 do not reflect the recesses in the pin-facing surfaces of the arms. If the impressions reflect the shapes of the recesses, parts of the impressions will have a reverse draft. In this case, the dies 10 (the upper die and the lower die) may have open spaces for a second tool, which will be described later.

The dies 10 (the upper die and the lower die) may have groove-like open spaces 10c for first jigs 30 (see FIG. 8A).

In order to guide each of the first tools 20 from a retracting position to a contacting position, projections 20d extending in a first guide direction (see the solid arrows in FIGS. 8C and 8D) are formed on an upper surface 20b and a lower surface 20c of each of the first tools 20. The dies 10 have groove-like recesses 10d formed at the bottoms of the open spaces 10b for each of the first tools 20, and the projections 20d of the first tool 20 are fitted in the groove-like recesses 10d. Then, the first tool 20 moves from the retracting position to the contacting position along the side walls of the recesses 10d made in the open space 10b (in the dies 10) and the side surfaces 20e of the projections 20d of the first tool 20. Accordingly, the side walls of the recesses 10d made in the open space 10*b* (in the dies 10) and the side surfaces 20*e* of the projections 20*d* formed on the upper surface 20*b* and the lower surface 20*c* of the first tool 20 function as guides (first guides).

The forged crankshaft manufacturing apparatus according to the present embodiment does not need to use the side surfaces of each of the first tools 20 as first guides. In the forged crankshaft manufacturing apparatus according to the present embodiment, each of the first tools 20 has at least one first guide on at least one of the upper surface 20*b* and the lower surface 20*c*. Therefore, the side surfaces of the first tool 20 need not be flat. The shapes of the side surfaces of the first tool 20 may be changed appropriately. For example, the side surfaces of the first tool 20 may be beveled or rounded. This leads to a decrease of the width of the first tool 20, which prevents interference of the first tool 20 with the first jig 30 or the dies 10. This ensures the first tool 20 a sufficiently wide movable range.

During a process by use of the dies 10, the first excess portions are deformed to increase the thicknesses of the side portions of a rough arm in the region near the adjacent rough pin. Thereby, in the produced crankshaft, the arm has thick side portions and has a recess in the journal-facing surface. Accordingly, the produced crankshaft has a reduced weight and assured stiffness.

Before deformation of the first excess portions, the first tools are brought into contact with the respective rough-journal-facing surfaces of the rough arms, whereby the recesses and other shapes in the rough-journal-facing surfaces can be retained during the process. In this manner, each of the arms obtains thick side portions in the region near the adjacent pin, whereby the inner area is recessed. Accordingly, in the produced crankshaft, each of the arms has an accurate shape.

Forged crankshaft manufacturing apparatuses according to the present invention is not limited to that shown in FIGS. 8A to 8D, wherein two first tools come into contact with two rough arms which are plane symmetrical with respect to a rough journal therebetween.

Figure 9:
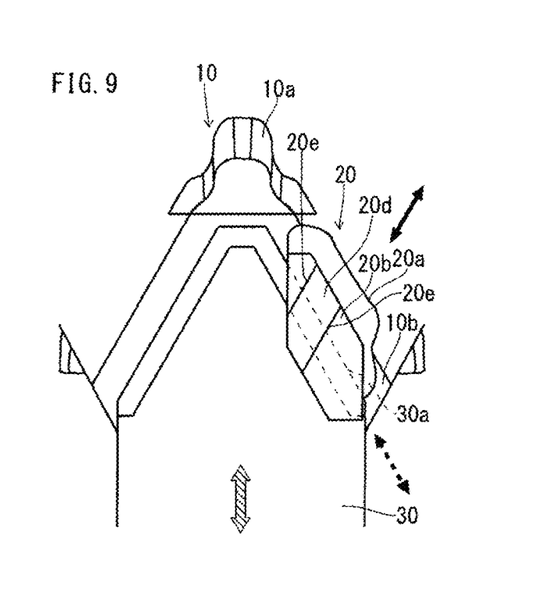
FIG. 9 is a diagram showing a forged crankshaft manufacturing apparatus having another exemplary configuration different from the configuration shown in FIGS. 8A to 8D.

FIG. 9 is a diagram showing a forged crankshaft manufacturing apparatus having another exemplary configuration according to the present invention that is different from the configuration shown in FIGS. 8A to 8D. FIG. 9 is a top view showing a state where a tool is in a contacting position. In the case of FIG. 9, one first tool 20 is supported by a first jig 30. There are no other differences in configuration from the manufacturing apparatus shown in FIGS. 8A to 8D. The manufacturing apparatus shown in FIG. 9 can be used for manufacture of a four-cylinder eight-counterweight crankshaft as shown in FIG. 1F and for manufacture of a four-cylinder four-counterweight crankshaft as shown in FIG. 2, for example. This will be described with reference to FIG. 10.

Figure 10:
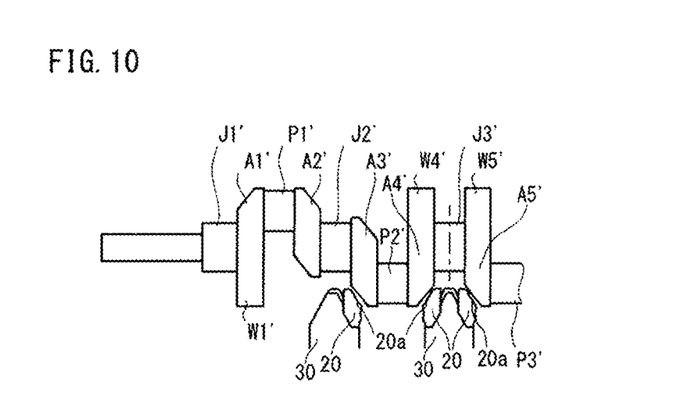
FIG. 10 is a top view showing the positional relationship between tools according to the embodiment and a forged blank.

FIG. 10 is a top view showing the positional relationship between tools according to the present embodiment and a forged blank. In FIG. 10, a first jig 30 supporting two first tools 20 and another first jig 30 supporting one first tool 20 are shown. For example, the second rough pin P2' is in the same phase as the third rough pin P3'. The fourth rough arm A4' and the fifth rough arm A5' are plane symmetrical with respect to the third rough journal J3'. Therefore, the first jig 30 located to face the third rough journal J3' support two first tools 20. In this case, the two first tools 20 are capable of coming into contact with the fourth rough arm A4' and the fifth rough arm A5', respectively.

The first rough pin P1' is in a different phase from that of the second rough pin P2'. Therefore, the first jig 30 located to face the second rough journal J2' supports one first jig 20. In this case, the first tool 20 is capable of coming into contact with either one of the second rough arm A2' or the third rough arm A3'. FIGS. 9 and 10 show a first tool 20 contacting the third rough arm A3'.

As described above, when two first tools are to come into contact with two rough arms which are plane symmetrical with respect to a rough journal therebetween, if both side portions of each of the tools are used as guides, the two tools will be likely to interfere with each other. This will decrease the movable range of each of the first tools. For ensuring of a sufficiently wide movable range for each of the tools, it is preferred that the two first tools to come into contact with the two rough arms which are plane symmetric with respect to a rough journal therebetween each have at least one first guide on at least one of the upper surface and the lower surface. As mentioned above, the two rough arms which are plane symmetric with respect to a rough journal therebetween are two rough arms connecting with one rough journal and connecting with rough pins which are in the same phase.

Diverging from the exemplary configuration shown in FIGS. 8A to 8D, the first tools 20 could be fixed to the first jigs 30. In this case, each of the first tools can be moved in the first guide direction by a movement of the first jig in the first guide direction. However, in the configuration, the first guide directions in which the plurality of tools are to be moved are different, and therefore, the plurality of first jigs 30 shall be moved different directions. Then, the first jigs 30 may interfere with drive units (not shown), which decreases the movable ranges of the first tools.

In order to prevent the interferences between the first jigs 30 and the drive units (not shown) and in order to meet the conditions for the first jigs 30 to be moved in the same direction, as shown in FIGS. 8A to 8D, the jigs 30 in the manufacturing apparatus are preferably movable in a pin decentering direction in which the pins are decentered from the journals. In this case, the first tools 20 are supported by the first jigs 30. Each of the first tools 20 is movable in a first slide direction (see the dashed arrows in FIGS. 8C and 8D) that is at an angle to the first guide direction of the first tool 20. In the manufacturing apparatus including such first jigs 30, the first tools can be moved in the respective first guide directions by movements of the first jigs in the pin decentering direction. This allows each of the first tools 20 to be located between two adjacent rough arms, which prevents the first tools 20 from interfering with the forged blank. The first jigs 30 are moved in the pin decentering direction, that is, in the same direction. This allows one drive unit to be shared between the first jigs 30, which leads to simplification of the configuration of the manufacturing apparatus. This ensures each of the first tools a sufficiently wide movable range and allows each of the first tools to be located in a smaller space.

The first slide direction of each of the first tools can be set appropriately in accordance with the first guide direction. For example, the first slide direction may be a direction along the part of the rough arm which the first tool is to come into contact with.

When two first tools are brought into contact with two rough arms which are plane symmetrical with respect to a rough journal therebetween, it is preferred that the two first tools are movably supported by one first jig. This also leads to simplification of the configuration of the manufacturing apparatus and ensures each of the first tools a sufficiently wide movable range.

Figure 11A:
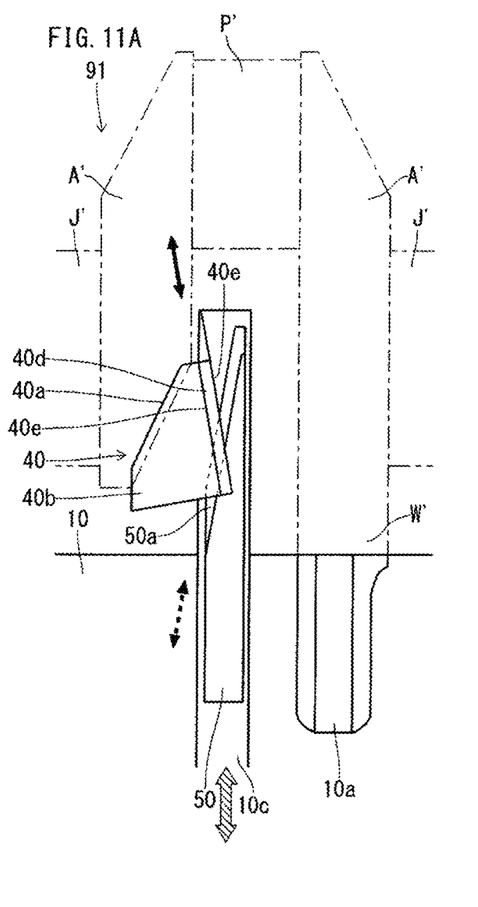
FIG. 11A is a top view showing a state where, in a forged crankshaft manufacturing apparatus according to an embodiment further including a second tool, the second tool is in a contacting position.
Figure 11B:
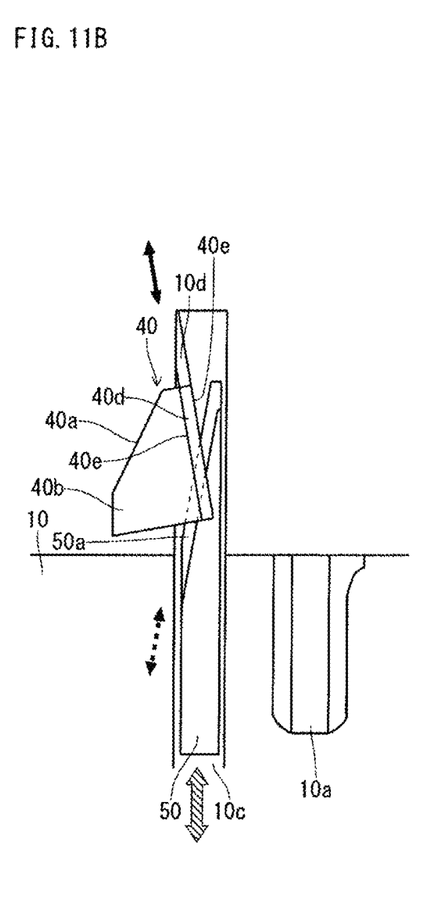
FIG. 11B is a top view showing a state where, in the forged crankshaft manufacturing apparatus according to the embodiment further including a second tool, the second tool is in a retracting position.

Next, with reference to FIGS. 11A and 11B, another exemplary configuration of the manufacturing apparatus is described. In this configuration, the manufacturing apparatus further includes second tools, each of which is to come into contact with the rough-pin-facing surface of a rough arm with no rough weight.

FIGS. 11A and 11B are diagrams showing a manufacturing apparatus having an exemplary configuration according to the present embodiment, the manufacturing apparatus further including second tools. FIG. 11A is a top view showing a state where the second tools are in contacting positions. FIG. 11B is a top view showing a state where the second tools are in retracting positions. In FIGS. 11A and 11B, the dies 10, a second tool 40 and a second jig 50 are shown. In FIGS. 11A and 11B, a part of a lower die of the dies 10 are shown. To make the drawings easy to understand, in FIG. 11A, the outline of the forged blank 91 with no flash is indicated by a chain line. In FIGS. 11A and 11B, the first tools 20 are omitted.

The forged blank 91 indicated by a chain line in FIG. 11A is, for example, a forged blank for a four-cylinder four-counterweight crankshaft shown in FIG. 2. FIG. 11A shows two adjacent rough arms A' across a rough pin P', the rough pin P' located between the two adjacent rough arms A', and two rough journals J' which the two rough arms A' connect with, respectively. One of the two rough arms A' is a rough arm with no rough weight, and the other is a rough arm with a rough weight.

In the forged blank 91, as in the forged blank shown in FIG. 7A, the rough arm with no rough weight additionally has second excess portions protruding from the outer peripheries of both side portions in a region near the adjacent rough journal. In FIGS. 11A and 11B, the second excess portions are omitted.

The second tool 40 comes into contact with the rough arm with no rough weight, the rough-pin-facing surface thereof, except both side portions. For example, a front face 40a of the second tool 40 comes into contact with the rough-pin P'-facing surface of the rough arm A', and specifically the inner area At inside of the side portions Ac' and Ad' in the region near the adjacent rough journal J', that is, an area to become a recess after the process. FIGS. 11A and 11B show one of the second tools 40 of the manufacturing apparatus and the surrounding area thereof.

The dies 10 (the upper die and the lower die) have open spaces for the second tools 40. Further, the dies (the upper die and the lower die) have groove-like open spaces 10c for the second jigs 50.

As with the first tools, in order to guide each of the second tools 40 from a retracting position to a contacting position, projections 40d extending in a second guide direction (see the solid arrows in FIGS. 11A and 11B) are formed on an upper surface 40b and a lower surface of each of the second tools 40. The dies 10 also have groove-like recesses 10d which the projections 40d of the second tools 40 are fitted in. Then, each of the second tools 40 moves from the retracting position to the contacting position along the side walls of the recesses 10d made in the dies 10 and the side surfaces 40e of the projections 40d of the second tool 40. Accordingly, the side walls of the recesses 10d made in the dies 10 and the side surfaces 40e of the projections 40d formed on the upper surface 40b and the lower surface of the second tool 40 function as guides (second guides).

By providing at least one second guide to each of the second tools 40 such that the second guide is located on at least one of the upper surface 40b and the lower surface, it is possible to prevent interference of the second tool 40 with the second jig 50 or the dies 10. This ensures the second tool 40 a sufficiently wide movable range. During a process by use of the dies 10, the second excess portions are deformed to increase the thicknesses of the side portions of each of the rough arms with no rough weights in the region near the adjacent rough journal. This allows manufacture of a crankshaft having a reduced weight and assured stiffness as shown in FIGS. 6A to 6D. During the process, also, each of the rough arms with no rough weights can retain the surface shape of the rough-pin-facing surface by the contact with the second tool. In this manner, each of the arms with no weights obtains thick side portions in the region near the adjacent journal, whereby the inner area is recessed. Accordingly, in the finished crankshaft, each of the arms has an accurate shape.

As with the first jigs 30, in order to prevent interferences between the second jigs 50 and drive units (not shown) and in order to meet the conditions for the second jigs 50 to be moved in the same direction, the jigs 50 in the manufacturing apparatus are preferably movable in the pin decentering direction (see the hatched arrows in FIGS. 11A and 11B). In this case, as with the jig shown in FIGS. 8A to 8D, the second jigs 50 support the second tools 40 such that each of the second tools 40 is movable in a second slide direction (see the dashed arrows in FIGS. 11A and 11B) that is at an angle to the second guide direction in which the second tool 40 is guided by the second guides.

The second slide direction of each of the second tools can be set appropriately in accordance with the second guide direction. For example, the second slide direction may be a direction along the part of the rough arm which the second tool is to come into contact with.

3. Forged Crankshaft Manufacturing Method

A method for manufacturing a forged crankshaft by use of the above-described manufacturing apparatus according to the present embodiment will hereinafter be described. A case where the manufacturing apparatus according to the present embodiment is used in a coining step will be described below.

The manufacturing process may have the same configuration as a conventional manufacturing process. For example, the manufacturing process includes a preforming step, a die forging step, a trimming step and a coining step. In this case, in order to obtain a forged blank with no flash as shown in FIG. 5A, in the die forging step, a forged blank with flash, which includes rough arms each having first excess portions protruding from the outer peripheries of side portions in a region near an adjacent rough pin, is formed. Thereafter, in the trimming step, the flash is removed from the forged blank with flash.

In the coining step, the forged crankshaft manufacturing apparatus shown in FIGS. 8A to 8D is used. First, the upper die and the lower die of the pair of dies 10 are separated from each other, and the first tools are placed in the retracting positions. Then, the forged blank with no flash is carried in and placed between the upper die and the lower die.

Next, the first tools are moved to the contacting positions, and the first tools come into contact with the rough-journal-facing surfaces of the rough arms of the forged blank. In this state, the upper die and the lower die are moved toward each other. More specifically, the upper die is moved to the bottom dead point, and the forged blank is slightly reduced by the pair of dies 10. Accordingly, coining is applied to the forged blank, and the forged blank is corrected to have the size and the shape of the finished product.

In the forged crankshaft manufacturing apparatus according to the present embodiment, during the coining, the first excess portions are deformed so that each of the rough arms obtains thickened side portions in the region near the adjacent rough pin. The deformation of the first excess portions is carried out, for example, by crashing of the first excess portions by use of the dies 10. Alternatively, the first excess portions are bent toward the rough journals along the impressions of the dies 10. In this way, the first excess portions are deformed into shapes along the impressions of the dies 10 and caused to bulge toward the journals.

After completion of the coining and the deformation of the first excess portions, the upper die and the lower die are separated from each other. More specifically, the upper die is moved to the top dead point, and the first tools are moved to the retracting positions. Thereafter, the processed forged blank is taken out. In this way, a crankshaft as shown in FIGS. 4A to 4D can be obtained.

When the forged crankshaft manufacturing apparatus further includes second tools to come into contact with the rough-pin facing surfaces of rough arms with no rough weights, a forged blank with flash further including second excess portions as shown in FIG. 7A is formed in the die forging step. In the coining step, the second tools are moved to the contacting positions and the retracting positions in the same manner as the first tools. In this way, a crankshaft including arms as shown in FIG. 6A can be obtained.

A case where the manufacturing apparatus according to the present embodiment is used in the coining step has been described. However, the manufacturing apparatus according to the present embodiment can be used in any other step than the coining step. For example, when the manufacturing method includes an additional processing step before or after the coining step, the manufacturing apparatus according to the present embodiment may be used in the additional processing step. When the coining step is not needed, another processing step shall be added after the trimming step, and the manufacturing apparatus according to the present embodiment shall be used in the processing step. In sum, the manufacturing apparatus according to the present embodiment is used to process excess portions of a forged blank from which flash has been removed.

INDUSTRIAL APPLICABILITY

The present invention is efficiently utilized for manufacture of a forged crankshaft to be mounted in a reciprocating engine.

LIST OF REFERENCE SYMBOLS

1: forged crankshaft
J, J1 to J5: journal
P, P1 to P4: pin
Fr: front
Fl: flange
A, A1 to A8: crank arm
W, W1 to W8: counterweight
J': rough journal
P': rough pin
A': rough crank arm
W': rough counterweight
Aa, Ab: side portion of an arm in a region near a pin
Aa', Ab': side portion of a rough arm in a region near a rough pin
Aaa, Aba: first excess portion
Ac, Ad: side portion of an arm in a region near a journal
Ac', Ad': side portion of a rough arm in a region near a rough journal
Aca, Ada: second excess portion
As: inner area of a journal-facing surface of an arm, inside of side portions
At: inner area of a pin-facing surface of an arm, inside of side portions
10: pair of dies
10a: impression
10b: open space for tool
10c: open space for jig
10d: recess
20: first tool
20a: front face (impression)
20b: upper surface
20c: lower surface
20d: projection
20e: side surface of projection (first guide)
30: first jig
30a: projection
40: second tool
40a: front face (impression)
40b: upper surface
40d: projection
40e: side surface of projection (second guide)
50: second jig
50a: projection
91: forged blank with no flash
92: tool having side surfaces to serve as guides
92a: front face (impression)
92b: side surface (guide)
92c: recessed portion
92d: groove
93: jig
93a: projection

The invention claimed is:
1. A manufacturing apparatus for processing a forged blank from which flash has been removed,
the forged blank including rough journals, rough pins, rough crank arms and rough counterweights, the rough pins decentered from the journals so as to define a rough pin decentering direction, and at least one of the rough crank arms including a first excess portion protruding from a side portion in a region near an adjacent one of the rough pins;
the manufacturing apparatus comprising:
a pair of upper and lower dies configured for deforming the first excess portion and thereby thickening the side portion of the rough crank arm including the first excess portion in the region near the adjacent rough pin; and
a first tool fitted in an open space made in the pair of dies, the first tool configured for coming into contact with a rough-journal-facing surface of the rough crank arm, except the side portion in the region near the adjacent rough pin, before deformation of the first excess portion by the pair of upper and lower dies, the first tool retaining a shape of the rough-journal facing surface during deformation of the first excess portion, wherein:
the pair of dies and the first tool have first guides to guide the first tool from a retracting position to a contacting position; and
the first guide of the first tool is disposed on at least one of an upper surface and a lower surface of the first tool; and
further comprising:
a first jig movable in the rough pin decentering direction, wherein:

the first jig supports the first tool such that the first tool is movable in a first slide direction that is at an angle to a first guide direction in which the first tool is guided by the first guides; and the first tool moves in the first guide direction along with a movement of the first jig.

2. The manufacturing method according to claim 1, wherein the pair of upper and lower dies are dies to apply coining to the forged blank.

3. The manufacturing apparatus according to claim 1, wherein the forged blank includes a second excess portion protruding from an outer periphery of a side portion of at least one of the rough crank arms with no rough counterweights in a region near an adjacent one of the rough journals, the manufacturing apparatus further comprising:

a second tool fitted in an open space made in the pair of dies, the second tool capable of coming into contact with a rough-pin-facing surface of the rough crank arm, except the side portion in the region near the rough journal, wherein the pair of dies is further capable of deforming the second excess portion and thereby thickening the side portion in the region near the adjacent rough journal; and further wherein the pair of upper and lower dies and the second tool have second guides to guide the second tool from a retracting position to a contacting position; and the second guide of the second tool disposed on at least one of an upper surface and a lower surface of the second tool.

4. The manufacturing method according to claim 3, wherein the pair of upper and lower dies are dies to apply coining to the forged blank.

5. A manufacturing apparatus for processing a forged blank from which flash has been removed, the forged blank including rough journals, rough pins, rough crank arms and rough counterweights, and at least one of the rough crank arms including a first excess portion protruding from a side portion in a region near an adjacent one of the rough pins, the forged blank including a second excess portion protruding from an outer periphery of a side portion of at least one of the rough crank arms with no rough counterweights in a region near an adjacent one of the rough journals;

the manufacturing apparatus comprising:

a pair of upper and lower dies configured for deforming the first excess portion and thereby thickening the side portion of the rough crank arm including the first excess portion in the region near the adjacent rough pin; and a first tool fitted in an open space made in the pair of dies, the first tool configured for coming into contact with a rough-journal-facing surface of the rough crank arm, except the side portion in the region near the adjacent rough pin, before deformation of the first excess portion by the pair of upper and lower dies, the first tool retaining a shape of the rough-journal facing surface during deformation of the first excess portion, wherein:

the pair of dies and the first tool have first guides to guide the first tool from a retracting position to a contacting position; and the first guide of the first tool is disposed on at least one of an upper surface and a lower surface of the first tool, and further comprising:

a second tool fitted in an open space made in the pair of dies, the second tool capable of coming into contact with a rough-pin-facing surface of the rough crank arm, except the side portion in the region near the rough journal, wherein the pair of dies is further capable of deforming the second excess portion and thereby thickening the side portion in the region near the rough journal; and further wherein the pair of upper and lower dies and the second tool have second guides to guide the second tool from a retracting position to a contacting position; and the second guide of the second tool disposed on at least one of an upper surface and a lower surface of the second tool.

6. The manufacturing method according to claim 5, wherein the pair of upper and lower dies are dies to apply coining to the forged blank.

* * * * *

UNITED STATES PATENT AND TRADEMARK OFFICE
CERTIFICATE OF CORRECTION

PATENT NO. : 10,828,693 B2
APPLICATION NO. : 15/572258
DATED : November 10, 2020
INVENTOR(S) : Yamashita et al.

Page 1 of 1

It is certified that error appears in the above-identified patent and that said Letters Patent is hereby corrected as shown below:

In the Claims

Column 19, Line 22 Claim 3:
"ening the side portion in the region near the adjacent"
Should read:
"ening the side portion in the region near the"

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*